No. 765,182. PATENTED JULY 19, 1904.
J. H. KING.
TUBULAR STRAINER.
APPLICATION FILED MAY 11, 1901.
NO MODEL.

Witnesses:
F. F. Oldham
C. A. Lehmkuhl

Inventor:
John H. King
By Murray & Murray
Attys

No. 765,182.

Patented July 19, 1904.

UNITED STATES PATENT OFFICE.

JOHN H. KING, OF COVINGTON, KENTUCKY, ASSIGNOR OF ONE-HALF TO THE KISINGER-ISON COMPANY, OF CINCINNATI, OHIO, A CORPORATION OF OHIO.

TUBULAR STRAINER.

SPECIFICATION forming part of Letters Patent No. 765,182, dated July 19, 1904.

Application filed May 11, 1901. Serial No. 59,735. (No model.)

*To all whom it may concern:*

Be it known that I, JOHN H. KING, a citizen of the United States of America, and a resident of Covington, in the county of Kenton and State of Kentucky, have invented certain new and useful Improvements in Tubular Strainers, of which the following is a specification.

The object of my invention is a tubular strainer in which the slots are uniform, may be made as fine as desired, and are produced without the use of cutting-tools, which may be made of any desired metal and which may be produced rapidly and at comparatively small expense.

Figure 1:
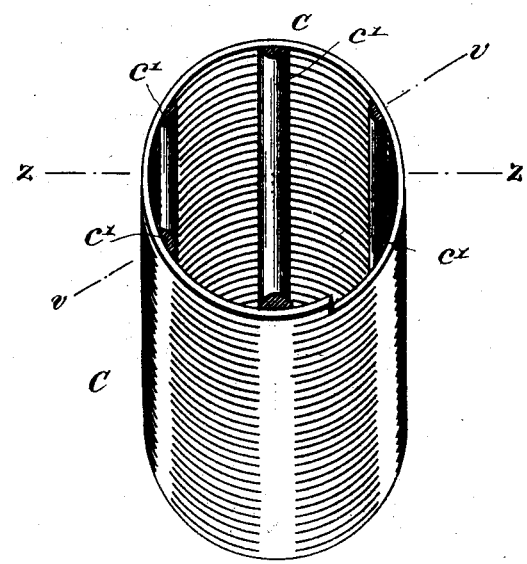
Figure 2:
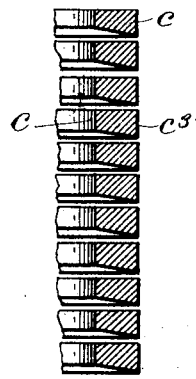
Figure 3:
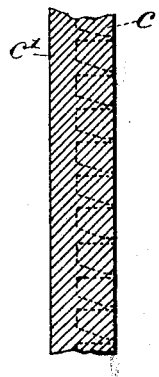
Figure 4:

In the accompanying drawings, in which like parts are indicated by similar letters of reference wherever they occur throughout the various views, Figure 1 is a perspective view of a section of the strainer embodying my invention. Fig. 2 is a vertical section of the same, taken upon line $zz$ of Fig. 1. Fig. 3 is a similar view taken upon line $vv$ of same figure. Fig. 4 is a similar view of a modified form of strainer.

Referring to the drawings, strainer C is formed from a continuous wire $c$, that is wound helically into the shape of a cylinder, leaving narrow slits or slots between the helices. The degree of fineness of these slots depends upon the use to which the strainer is to be put. After the wire has been wound to form a cylinder of the length desired the helices are bound in place by transverse bars $c'$, secured by brazing or soldering to the helices. The shape of the cross-section of wire $c$ is that of a truncated triangle. If the strainer is to be used in a well—that is, if the water containing the sediment is to surround the strainer and filter through the slots to the interior thereof—the wire is wound with the shorter of its parallel sides inward, and if it is to be put to use in separating the sediment from water, placed in its interior and filtering through to the exterior, the longer, $c^3$, of its parallel sides is placed upon the inside.

It is evident that with my strainer the wire to be used may be of a variety of metals, since there being no sawing necessary to form the slots a metal of the degree of hardness such as to resist the cutting action in filtering of sand and grit may be used, and that the slots may be made as fine as desired, and that my strainer may be made much more rapidly and inexpensively than those in which slots are sawed into a cylinder.

What I claim is—

1. A strainer consisting of a wire which in cross-section presents a straight side, wound into a helix leaving slits between the successive spirals and with the straight side coming upon the side of the helix which in use contacts the liquid containing the foreign matter to be separated therefrom substantially as shown and described.

2. A tubular strainer consisting of a continuous wire which in cross-section is that of a truncated triangle wound helically leaving slots between the helices and bound together by bars transverse to and secured to the wire, substantially as shown and described.

JOHN H. KING.

Witnesses:
 EMMA LYFORD,
 GEO. J. MURRAY.